(12) United States Patent
Park et al.

(10) Patent No.: US 9,103,908 B2
(45) Date of Patent: Aug. 11, 2015

(54) SECURITY MONITORING SYSTEM USING BEAMFORMING ACOUSTIC IMAGING AND METHOD USING THE SAME

(75) Inventors: Kang-Ho Park, Daejeon (KR); Sung Q Lee, Daejeon (KR); Woo Seok Yang, Daejeon (KR); Jongdae Kim, Daejeon (KR); Semyung Wang, Gwangju (KR); Daesung Kim, Gwangju (KR); Kihyun Kim, Gwangju (KR)

(73) Assignees: ELECTRONICS AND TELECOMMUNICATIONS RESEARCH INSTITUTE, Daejeon (KR); GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 628 days.

(21) Appl. No.: 13/289,392

(22) Filed: Nov. 4, 2011

(65) Prior Publication Data

US 2012/0140597 A1 Jun. 7, 2012

(30) Foreign Application Priority Data

Dec. 7, 2010 (KR) ........................ 10-2010-0124374

(51) Int. Cl.
*G01S 15/00* (2006.01)
*G01S 15/04* (2006.01)
*G01S 7/52* (2006.01)
*G01S 15/89* (2006.01)

(52) U.S. Cl.
CPC ............. *G01S 15/04* (2013.01); *G01S 7/52003* (2013.01); *G01S 15/89* (2013.01)

(58) Field of Classification Search
USPC .................................................. 367/99, 103
See application file for complete search history.

(56) References Cited

U.S. PATENT DOCUMENTS

| | | | | |
|---|---|---|---|---|
| 4,386,343 A | * | 5/1983 | Shiveley | 340/566 |
| 4,991,146 A | * | 2/1991 | Ransdell et al. | 367/98 |
| 5,021,766 A | * | 6/1991 | Genahr et al. | 340/544 |
| 5,608,377 A | * | 3/1997 | Zhevlev et al. | 340/506 |
| 5,696,489 A | * | 12/1997 | Haynes et al. | 340/541 |
| 5,828,626 A | * | 10/1998 | Castile et al. | 367/93 |
| 5,973,996 A | * | 10/1999 | Zhevelev et al. | 367/99 |
| 6,337,625 B1 | * | 1/2002 | Taylor et al. | 340/541 |

(Continued)

FOREIGN PATENT DOCUMENTS

| | | |
|---|---|---|
| JP | 2009-143453 A | 7/2009 |
| KR | 1020040025148 A | 3/2004 |

(Continued)

*Primary Examiner* — James Hulka

(57) ABSTRACT

Disclosed is a security monitoring method determining whether a trespasser is detected and a position of the trespasser in a set security space and monitoring sound generated at the position of the trespasser by using an acoustic image generated from acoustic signals generated by an acoustic generating device and an acoustic measuring device in an array type. An exemplary embodiment of the present disclosure provides a security monitoring system including: an acoustic generating device that generates acoustic signals; a plurality of acoustic measuring devices that receive the acoustic signals; and an acoustic image processing device that generates an acoustic image using a beamforming algorithm from the acoustic signals received in the plurality of acoustic measuring devices and determines a position of a trespasser by comparing the acoustic image after the trespasser is detected with the acoustic image before the trespasser is detected.

15 Claims, 3 Drawing Sheets

(56) References Cited

U.S. PATENT DOCUMENTS

| | | | |
|---|---|---|---|
| 6,703,932 B2* | 3/2004 | Matsuzawa | 340/545.3 |
| 6,987,707 B2* | 1/2006 | Feintuch et al. | 367/99 |
| 7,535,351 B2 | 5/2009 | Reymond | |
| 2004/0021599 A1* | 2/2004 | Hall et al. | 342/28 |
| 2004/0223056 A1* | 11/2004 | Norris, Jr. | 348/152 |
| 2005/0058021 A1* | 3/2005 | Feintuch et al. | 367/99 |
| 2005/0083199 A1* | 4/2005 | Hall et al. | 340/552 |
| 2005/0151644 A1* | 7/2005 | Roche et al. | 340/552 |
| 2007/0041590 A1* | 2/2007 | Tice | 381/77 |
| 2008/0018461 A1* | 1/2008 | Reymond | 340/541 |
| 2008/0111686 A1* | 5/2008 | Hall et al. | 340/552 |
| 2011/0007606 A1* | 1/2011 | Curtis | 367/103 |

FOREIGN PATENT DOCUMENTS

| | | |
|---|---|---|
| KR | 1020080055340 A | 6/2008 |
| KR | 1020100022297 A | 3/2010 |

\* cited by examiner

SECURITY MONITORING SYSTEM USING BEAMFORMING ACOUSTIC IMAGING AND METHOD USING THE SAME

CROSS-REFERENCE TO RELATED APPLICATIONS

This application is based on and claims priority from Korean Patent Application No. 10-2010-0124374, filed on Dec. 7, 2010, with the Korean Intellectual Property Office, the present disclosure of which is incorporated herein in its entirety by reference.

TECHNICAL FIELD

The present disclosure relates to a security monitoring system using a beamforming acoustic imaging and a method using the same. More particularly, the present disclosure relates to a method of measuring an acoustic image associated with shape information on an object in a set security space by using an acoustic image obtained from an acoustic generating device and a detector array acoustic measuring device and a security monitoring method for determining presence and absence of trespassing objects and positions thereof and monitoring the positions of the trespassing objects by comparing a preset acoustic image with a changed acoustic image.

BACKGROUND

A security monitoring system is a field that has been researched for a long period of time. Recently, an intelligent security system technology has been actively researched. As the related art, there are a security camera type, an infrared (IR) type, an ultrasonic type, an acoustic measurement type, or the like.

The first related art, U.S. Pat. No. 7,535,351 (Acoustic intrusion detection system) discloses a technology of detecting whether the trespassers are intruded by comparing and sensing the difference between a magnitude and a phase of a sound wave generated from the trespassers and a magnitude and a phase of a sound wave before the intrusion of the trespassers by generating acoustic in an audible frequency domain from a bipolar emitter and disposing a pair of detectors in an acoustic offset null of the bipolar. The related art is restrictively used in a specific security zone to detect only whether the trespassers are intruded but it cannot monitor positions or movements of the trespassers.

The second related art, Korean Patent Application Laid-Open No. 2008-0055340 (System and method for intrusion sensing and alarm using ultrasonic wave for vehicle) discloses a technology of detecting an intrusion of a vehicle by using an ultrasonic wave. The related art is a technology relating to a system and a method for intrusion sensing and alarm using ultrasonic wave for vehicle that digitally modulates an ultrasonic wave and reduces erroneous detection due to echo or noise from the outside to improve detection precision, which may solve malfunction due to an ultrasonic wave from other vehicles. However, the related art may degrade power efficiency according to the use of an ultrasonic wave and may lead to errors such as generating intrusion signals regardless of whether the trespassers are intruded when an ultrasonic waveform is distorted due to objects or conditions in any space.

The third related art, Korean Patent Application Laid-Open No. 2004-0025148 (Apparatus and method for security using an environmental sound) discloses a technology of monitoring whether abnormality occurs in places to be monitored by using environmental sound generated according to environment of predetermined places to be monitored. The related art discloses a method of disposing a detector in the predetermined places to be monitored to allow a feature extractor to extract predetermined characteristics from an acoustic signal, allowing an abnormality occurrence determination unit to compare the extracted features with an environmental acoustic reference model stored in a memory to determine whether abnormality occurs in the predetermined places, and if so, allowing an alarm output unit to generate an alarm signal so as to issue an alarm to a supervisor. The related art may not operate the monitoring device at the time of the intrusion of trespassers since the environmental sound is not changed when trespassers or intrusion objects are calmly intruded.

SUMMARY

The present disclosure has been made in an effort to implement performance and functions that are not provided by a security monitoring technology of the related art using a beamforming acoustic image technology.

The present disclosure has been made in an effort to provide the security monitoring method that monitors whether the trespassers are intruded and the positional information on trespassers and if so, issuing an alarm to a supervisor by measuring sound reflected or diffracted from an acoustic generating device using a beamforming detector array to generate an acoustic image having shape information on a space and comparing the obtained shape information with conditions before the intrusion of trespassers or confirms the information on trespasser later by storing sound from the positions of trespassers.

The present disclosure has been made in an effort to solve the problems of large power consumption due to the supervisory camera operated for 24 hours, the necessity of lighting during night vision, or the like, in the security camera method that is the security monitoring method of the related art, solve the problems of the non-operation of security monitoring in the intrusion of trespassers using an IR hazmat suit or a blocking device in the IR method, solve the power problem due to the low sound wave transfer efficiency to an air layer, the difficulty in using a scan method due to high linearity, the malfunction due to wind or sound, or the like, in the ultrasonic wave method and may facilitate the security monitoring by monitoring whether the trespassers are intruded and the positional information of the trespassers.

The present disclosure has been made in an effort to improve reliability and easiness of security by detecting whether the trespassers are silently intruded or intruded at night and the positional information of the trespassers by solving the problems of the method of detecting whether the trespassers are intruded using the IR sensor and the ultrasonic wave/acoustic detection or the security camera method that are the security monitoring method of the related art.

The present disclosure has been made in an effort to measures the acoustic image due to the reflection and diffraction of the sound wave by applying the acoustic detection technology using the beamforming method in the set security space using at least one detector and a plurality of detector arrays, obtains the information on the trespassers measurable in response to the change in the acoustic image, builds the security monitoring system using the information on the trespassers, and may use the security monitoring system alone and operate the security monitoring system by the cooperation with various security monitoring systems.

An exemplary embodiment of the present disclosure provides a security monitoring system, including: an acoustic generating device that generates acoustic signals; a plurality of acoustic measuring devices that receive the acoustic signals; an acoustic image processing device that generates an acoustic image using a beamforming algorithm from the acoustic signals received in the plurality of acoustic measuring devices and determines a position of a trespasser by comparing the acoustic image before the trespasser is detected and the acoustic image after the trespasser is detected.

Another exemplary embodiment of the present disclosure provides a security monitoring method using beamforming acoustic imaging, including: generating a reference acoustic image using an acoustic beamforming method; generating acoustic signals when a trespasser is detected; receiving the acoustic signals and generating an acoustic image of the trespasser using the acoustic beamforming method; and determining a position of the trespasser by comparing the acoustic image of the trespasser with the reference acoustic image.

According to the exemplary embodiments of the present disclosure, the security monitoring system may generate signals in the sound wave area of an audible frequency band (20 to 20,000 Hz) having the high transfer efficiency in the general space, may be simply installed at low cost, and may have higher utilization at places such as the sensor node, in which the energy source is limited due to the lower power consumption as compared with the camera, or the like.

According to the exemplary embodiments of the present disclosure, it may solve the problems of large power consumption due to the supervisory camera operated for 24 hours, the necessity of lighting during night vision, or the like, in the security camera method that is the security monitoring method of the related art, solve the problems of the non-operation of security monitoring in the intrusion of trespassers using the IR hazmat suit or the blocking device in the IR method, solve the power problem due to the low sound wave transfer efficiency to an air layer, and the difficulty in using a scan method due to high linearity, the malfunction due to wind or sound, or the like, in the ultrasonic wave method.

According to the exemplary embodiments of the present disclosure, it may have a low cost structure due to the beamforming acoustic image measuring principle and may be operated at low power even though the supervisory camera is operated for 24 hours and may determine whether the trespassers are intruded without lighting and may perform the monitoring without errors when the objects move in the predetermined space or there are the intrusion objects even though there is the IR blocking device.

According to the exemplary embodiments of the present disclosure, it may monitors whether trespassers are intruded by the change in acoustic field changed by the intrusion objects even though noises are not generated from the intrusion objects, thereby improving the stability and reliability of the security monitoring.

According to the exemplary embodiments of the present disclosure, it may monitor whether trespassers are intruded and the positional information on trespassers, thereby implementing a variety of high-reliable security/detection functions.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings.

Figure 1:
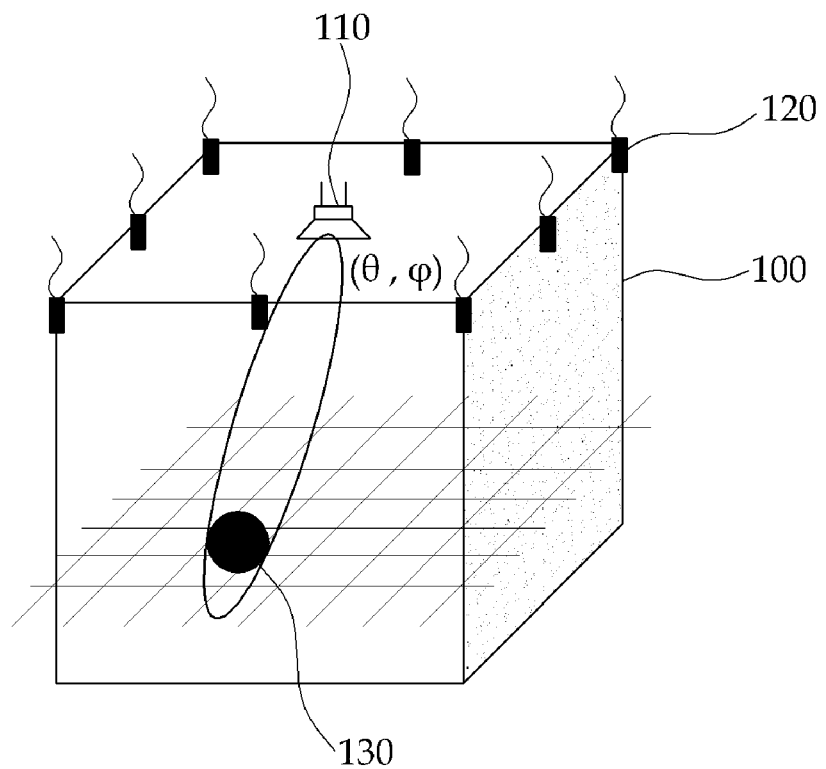
FIG. 1 is a conceptual diagram showing a configuration of a security monitoring system using beamforming acoustic imaging according to an exemplary embodiment of the present disclosure.

FIG. 1 is a conceptual diagram showing a configuration of a security monitoring system using beamforming acoustic imaging according to an exemplary embodiment of the present disclosure.

The security monitoring system shown in FIG. 1 includes an acoustic generating device 110 and an acoustic measuring device 120 in an array type so as to detect whether there is an trespasser 130 and a position of trespasser 130 in a set security space 100.

Acoustic generating device 110 is configured to generate acoustic signals so as to generate the acoustic images. Acoustic generating device 110 may be configured as a speaker that generates the acoustic signals in an audible frequency band of 20 to 20,000 Hz. An example of a type of the acoustic signal may include pink noise, white noise, or a sine wave in a predetermined frequency band. For example, as shown in FIG. 1, acoustic generating device 110 may be disposed at a center on a top surface of security space 100. Although FIG. 1 shows only one acoustic generating device 110, at least two acoustic generating devices 110 may be disposed according to a size of security space 100 or as needed.

The plurality of acoustic measuring devices 120 detect acoustic signals that are generated from acoustic generating device 110 and reflected or diffracted from a person or objects within security space 100 Acoustic measuring device 120 may be configured as a detector array that is arranged in a one-dimensional array or a two-dimensional array type at a predetermined distance within security space 100. For example, as shown in FIG. 1, acoustic generating device 120 may be disposed at a corner on the top surface of security space 100 at a predetermined distance.

Each acoustic measuring device 120 measures the intensity and phase of sound pressure at the installed position to determine a distribution of the acoustic signal within the security space 100. The distribution of the acoustic signal may obtain by performing angle division on the distribution image of the acoustic signal in a direction vertical to a plane on which the acoustic measuring device 120 is generally disposed. The distribution of the acoustic signal may be imaged by the sound beamforming method using the change in arrival time of the sound wave according to the position of acoustic measuring device 120 under the assumption that the sound wave of the acoustic signal generated in the specific direction reaches acoustic measuring device 120 as the plane wave, wherein the image formed as described above may be referred to as an acoustic image.

The method of using the acoustic image in security previously measures the acoustic image when there are no trespassers and defines the previously measured acoustic image as a reference image, generates the acoustic signal when the presence of trespasser 130 is detected by primary detection for a security period in which security needs to be reinforced, and measures the acoustic image to confirm whether the trespasser is detected and detect the positional information of the trespasser. For example, a method of detecting whether trespasser 130 is detected all the times by continuously monitoring the acoustic image for a predetermined period may be used. However, the method increases power consumption and needs to periodically generate the acoustic signals. Accordingly, when the primary detection security system for acoustic detection such as an infrared (IR) sensor, an ultrasonic sensor, detects the trespasser, a method of operating acoustic generating device 110 so as to generate the acoustic signal and acoustic measuring device 120 so as to detect the acoustic signals may be used.

A method of generating the acoustic image may use the simplest time delay & sum algorithm. However, the algorithm also includes sidelobe and interference of the acoustic signals in other directions to deteriorate resolution. Therefore, the resolution and accuracy may be improved by using various beamforming algorithms.

Further, at least one acoustic generating device 110 and the plurality of acoustic measuring devices 120 are configured of sensor nodes and may measure all the acoustic images in security space 100 by configuring an acoustic measuring array by transmitting and receiving information between the sensor nodes.

The above-mentioned security monitoring system may determine whether the trespasser is detected and the positional information of the trespasser even in the case in which the intrusion object does not generate noises or even in the dark environment at night, when the movement of objects or the intrusion objects are generated within the predetermined space and may detect the sound wave in the audible frequency band even in the area in which the sound wave in the audible frequency band is covered by the objects due to the diffraction, or the like, thereby implementing performance differentiated from the security monitoring technology using the exiting IR, ultrasonic wave, and CCTV.

Figure 2:
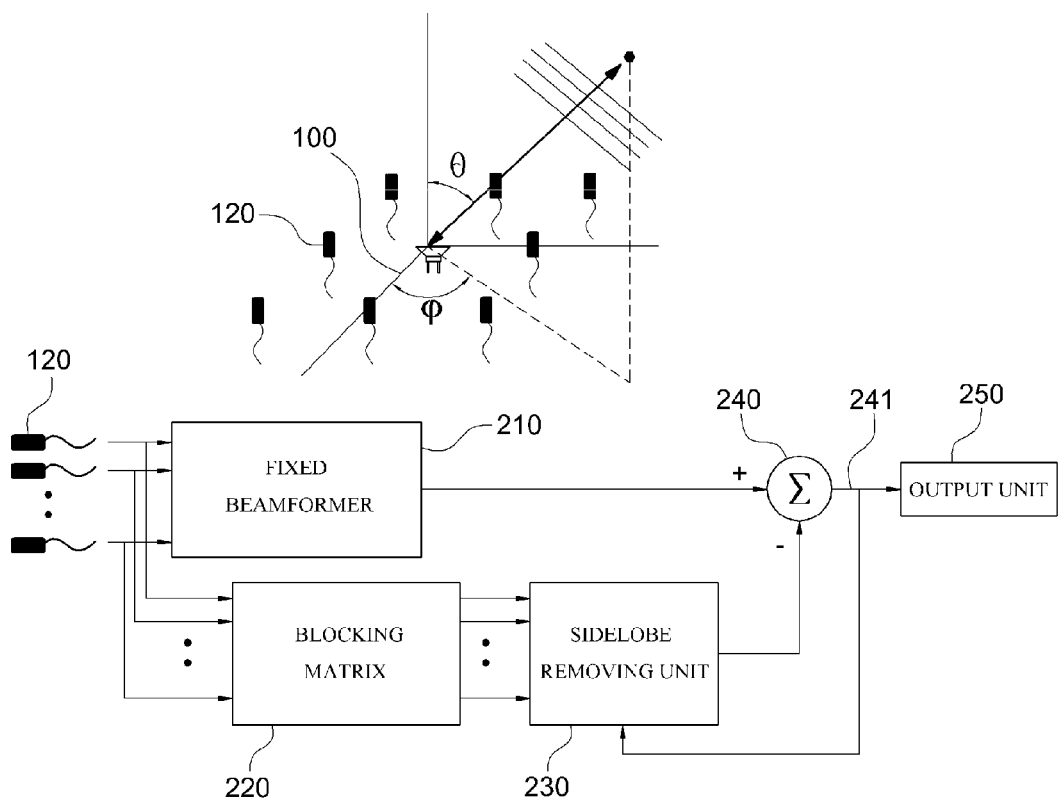
FIG. 2 is a conceptual diagram for explaining an acoustic image processing device generating beamforming acoustic images according to an exemplary embodiment of the present disclosure.

FIG. 2 is a conceptual diagram for explaining an acoustic image processing device generating beamforming acoustic images according to an exemplary embodiment of the present disclosure. FIG. 2 shows an algorithm processing device and process of generating the beamforming acoustic image from the signal received in the plurality of acoustic measuring devices 120 by detecting the acoustic signal in the specific direction while minimizing noise or sidelobe by applying an adaptive beamforming method.

FIG. 2 shows an example in which the adaptive beamforming technology is applied among various beamforming algorithms. The algorithm processing device shown in FIG. 2 includes a fixed beamformer 210, a blocking matrix 220, a sidelobe canceller 230, a summer 240, and an output unit 250.

Fixed beamformer 210 detects the acoustic signal in acoustic measuring devices 12 arranged in the two-dimensional array type, respectively and divides the detected acoustic signal into a specific frequency component using Fast Fourier Transform (FFT) and performs angle division on a specific angle direction (θ, φ) (where θ is a ceiling angle and φ is an azimuth angle), thereby obtaining the fixed beam acoustic distribution results in the time delay & sum type.

The signal detected in acoustic measuring device 120 is used to detect the noise component generated in other directions in addition to the sidelobe and the desired specific angle direction (θ, φ) by passing through a blocking matrix 220 and a sidelobe canceller 230, thereby detect components due to the sidelobe or the noises in other directions.

Summer 240 subtracts the output value from the sidelobe canceller 230 from the output value from the fixed beamformer 210, thereby canceling components due to the sidelobe or the undesired noise in other direction. As a result, the generated subtracted value is defined as error 241 and in order to minimize error 241, is feedback to the sidelobe canceller to be calculated.

The resolution and accuracy of the acoustic image may be improved by canceling the components due to the sidelobe or the undesired noise in other directions from the signal received in the acoustic measuring device 120 by using the adaptive beamforming algorithm. Therefore, according to the acoustic image processing device shown in FIG. 2, the accuracy of the information on the objects or the information on the trespasser within the security space may be improved.

Figure 3:
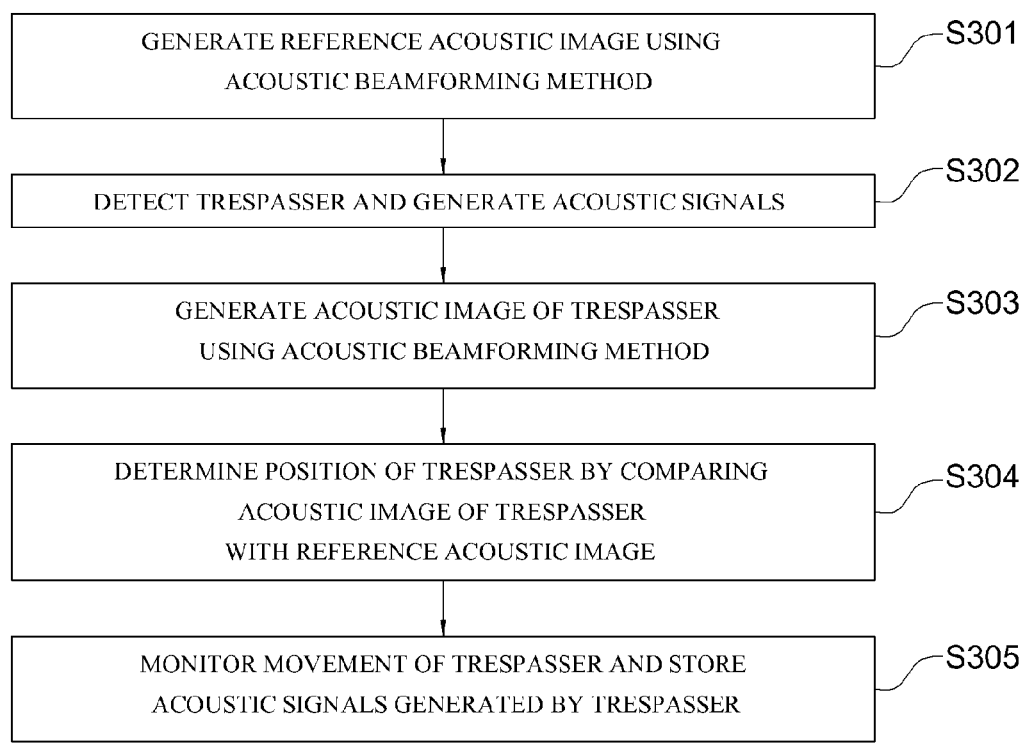
FIG. 3 is a flow chart showing an operation of the security monitoring system using the beamforming acoustic imaging according to an exemplary embodiment of the present disclosure.

FIG. 3 is a flow chart showing an operation of the security monitoring system using the beamforming acoustic imaging according to an exemplary embodiment of the present disclosure.

First, the reference acoustic image is generated by generating the acoustic signal using the acoustic generating device 110 previously installed in the security space 100 and detecting the acoustic signal using the plurality of acoustic measuring devices in the previously installed array type and by using the above-mentioned adaptive beamforming algorithm (S301). The generated reference acoustic image is stored in the storage unit of the security monitoring system and is used to compare with the trespasser acoustic image later.

Acoustic generating device 110 generates acoustic signals in response to the primary intrusion detection alarm while the plurality of acoustic measuring devices 120 detect the acoustic signal (S302). Acoustic generation device 110 and acoustic measuring device 120 may be used to detect the primary intrusion by continuously performing the monitoring for the predetermined period. However, the power consumption is slightly larger and the acoustic signal needs to periodically be generated. Therefore, the primary detection security system of the related art such as the IR sensor, the ultrasonic sensor, the acoustic detection sensor, or the like, is operated at usual time and the acoustic generating device 110 and the acoustic measuring device 120 may be operated only when the primary intrusion detection alarm is generated by detecting whether the trespasser is detected from the primary detection security system.

Next, the trespasser acoustic image is acquired using the acoustic beamforming method based on the acoustic signal received in the plurality of acoustic measuring devise 120 (S203). The acoustic image processing device may generate the trespasser acoustic images from which the components due to the sidelobe or the undesired noises in other directions from the signals received in the plurality of acoustic measuring devices 120 by using the above-mentioned adaptive beamforming algorithm.

Next, whether the trespasser is detected is reconfirmed and the positional information of the trespasser within the security space is obtained by comparing the previously stored reference acoustic image with the trespasser acoustic image (S304).

At the same time, the movement of the trespasser is monitored based on the positional information of the trespasser and the acoustic generated at the position of the trespasser is stored by the acoustic beamforming method (S305). As described above, the acoustic generated at the position of the trespasser is stored by the acoustic beamforming method and may be used as a voice and acoustic information for apprehending a criminal later.

In addition, the trespasser video information may be collected by moving the photographing direction of the video capturing device such as the CCTV to the position of the trespasser while monitoring the positions of the trespassers by using the trespasser acoustic image. This may be used as the video information for apprehending a criminal later.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A security monitoring system using beamforming acoustic imaging, the system comprising:
    a primary detection device that initially detects a trespasser in a space;
    an acoustic generating device that generates acoustic signals in response to the initial detection of the trespasser in the space,
    wherein the acoustic generating device generates the acoustic signals periodically for monitoring a position of the trespasser after initial detection of the trespasser in the space;
    a plurality of acoustic measuring devices that receive the acoustic signals; and
    an acoustic image processing device that periodically generates acoustic images that include a distribution of the acoustic signals by applying a beamforming algorithm to the acoustic signals received by the plurality of acoustic measuring devices and determines the position of the trespasser in a space by comparing a reference acoustic image of the space generated before the trespasser is detected and a generated acoustic image of the space generated after the trespasser is detected,
    wherein the acoustic image processing device includes a fixed beamformer or an adaptive beamformer detecting the acoustic signals in the plurality of acoustic measuring devices, dividing the detected acoustic signals into a specific frequency component using fast fourier transform and performing angle division on a specific angle direction, thereby obtaining the distribution of the acoustic signals.

2. The system of claim 1, wherein the acoustic generating device is a speaker generating an audible sound wave having a frequency between 20 to 20,000 Hz.

3. The system of claim 1, wherein the plurality of acoustic measuring devices are configured to be a detector array that is arranged in a one-dimensional array type or a two-dimensional array type at a predetermined distance.

4. The system of claim 3, wherein the acoustic image processing device generates a one-dimensional or two-dimensional acoustic image of a shape of the trespasser from acoustic signals reflecting or diffracting off the trespasser that are measured in the detector array.

5. The system of claim 1, wherein the acoustic signals are pink noise, white noise, or a sine wave.

6. The system of claim 1, wherein the acoustic image processing device divides the acoustic signals into frequency components.

7. The system of claim 1, wherein the acoustic image processing device performs angle division of the acoustic signals in a desired direction to generate the acoustic image.

8. The system of claim 7, wherein the acoustic image processing device removes sidelobe and noise components generated from other directions except the desired direction from the acoustic signals.

9. The system of claim 1, further comprising an infrared (IR) sensor or an ultrasonic sensor that detects the trespasser.

10. The system of claim 1, wherein the acoustic generating device and the plurality of acoustic measuring devices include sensor nodes, and information is transmitted and received through the senor nodes.

11. A security monitoring method using beamforming acoustic imaging, the method comprising:
    generating a reference acoustic image of a space that includes a distribution of acoustic signals by applying a beamforming algorithm to reference acoustic signals;
    initially detecting a trespasser in a space using an infrared sensor, an ultrasonic sensor, or an acoustic sensor;
    generating acoustic signals in response to the initial detection of the trespasser in the space and the acoustic signals periodically for monitoring a position of the trespasser after the initial detection of the trespasser in the space;
    generating an acoustic image of the trespasser periodically that includes a distribution of the generated acoustic signals by applying a beamforming algorithm to the generated acoustic signals; and
    determining the position of the trespasser by comparing the acoustic image of the trespasser with the reference acoustic image.

12. The method of claim 11, further comprising:
    storing the generated acoustic signals generated at a position of the trespasser while monitoring movement of the position of the trespasser.

13. The method of claim 11, further comprising:
    collecting a video information of the trespasser by moving a photographing direction of CCTV to a position of the trespasser while monitoring movement of the position of the trespasser.

14. The method of claim 11, wherein the trespasser is detected by using an infrared (IR) sensor or an ultrasonic sensor.

15. The method of claim 11, wherein generating an acoustic image of the trespasser that includes a distribution of the generated acoustic signals by applying a beamforming algorithm to the generated acoustic signals includes using a fixed beamformer, a blocking matrix, a sidelobe canceller, and a summer to generate the acoustic image of the trespasser.

* * * * *